Patented Apr. 9, 1940

2,196,593

UNITED STATES PATENT OFFICE

2,196,593

METHOD FOR PRODUCING ANHYDROUS CAUSTIC

Irving E. Muskat, Akron, Ohio, assignor to Pittsburgh Plate Glass Company, Allegheny County, Pa., a corporation of Pennsylvania No Drawing. Application July 28, 1936, Serial No. 93,022. Renewed June 6, 1939

13 Claims. (Cl. 23—184)

The present invention relates to methods of eliminating water from aqueous solutions, and it has particular relation to methods of eliminating water from aqueous solutions of caustic soda and to products obtained by application of such methods.

In accordance with my invention, I have found that anhydrous or substantially anhydrous alkali metal hydroxide may be prepared by treatment of aqueous hydroxides, preferably in concentration not substantially less than 50 percent by weight, with liquid ammonia. By preparing the hydroxide by this method, it is possible to avoid contamination of the hydroxide during concentration and to secure a highly concentrated, highly purified product without excessive fuel consumption. In general, the hydroxide thus produced is in the form of quickly soluble, free-flowing, crystalline or fluffy flakes which are especially suitable for certain chemical applications.

In the usual commercial methods of manufacture, caustic soda is initially produced in the form of relatively dilute solutions ranging in concentration of NaOH from 8 to 12 per cent by weight. These solutions must be concentrated to at least 50 per cent, and for many purposes to 100 per cent (solid, anhydrous NaOH). Concentration to 50 per cent is relatively simple, because the boiling point of the solution is relatively low, and high pressure steam is not required for the evaporation, particularly if the evaporation be conducted under reduced pressure as is customarily done. The temperature and caustic content of the solution being low, corrosion of equipment is slight, and steel or nickel may be used without excessive contamination of the product.

After a concentration of about 50 per cent has been reached, the difficulty of evaporation in ordinary evaporators rapidly increases because of an elevation of the boiling point. Even at reduced pressures, and above 75 per cent concentration, the boiling point becomes so high that it is not commercially feasible to concentrate the solution any further in conventional evaporators. Resort is then had to heating it by open flame in open cast-iron pots, known as "caustic pots". The vapor pressure of water over caustic solutions containing more than 95 per cent NaOH is so low that the liquids, now consisting substantially of molten NaOH, must be heated to 1000 to 1100 degrees F. in order to remove the last traces of water. Nitre must, also, be added to oxidize sulfur compounds of low valence, and sulfur must be added towards the end of the operation to precipitate the iron which has been taken up from the pot. After complete dehydration, the caustic must be held molten for many hours to allow the iron to settle. Finally the top portion of the molten liquid comprising the desired product is separated, leaving the "bottoms," which are badly contaminated and discolored by iron compounds and which have little commercial utility. About two days are required completely to dehydrate caustic even of 75 per cent initial concentration.

The many disadvantages of such method of dehydration are manifest. For example, the operation is necessarily intermittent and subject to all the economic and technical disadvantages of such processes. Because of the slowness of the evaporation, much space and equipment are required. Since a "caustic pot" is a poor apparatus for heat transfer, by far the greater part of the heat developed is wasted, and this is a very considerable item in the cost of the finished product. The handling of large quantities of molten caustic at temperatures as high as 1100 degrees F. involves considerable hazard, and expensive precautions must be taken to avoid injury to workmen. No metal, base or noble, is known to the industry which is perfectly resistant to the action of molten caustic soda. The corrosion of the conventional cast-iron pots contaminates the product to such degree that the "bottoms" comprising a considerable proportion of the total product are unfit for most purposes to which caustic soda is normally applied. All the impurities present in 50 per cent liquor, in addition to those picked up during dehydration, appear in the final product, and no entirely satisfactory method is known for their removal. Materials which are off color must be sold at reduced prices. Furthermore, grinding the solid product to obtain it in free-flowing quickly soluble form, is a difficult and unsatisfactory procedure.

In United States Patent No. 1,961,590, it is proposed partially to concentrate a dilute solution (e. g. 20-30%) of caustic by treating it with a single portion of liquid ammonia at a temperature of about 60 degrees C. In such process the ammonia is substantially diluted by the water present in the caustic. The resultant solution separates into two liquid, aqueous layers; the lower of which, after removal of the upper layer, is subjected to evaporation in order to eliminate the ammonia. The ammonia-free material comprises caustic of about 50 per cent concentration. If an anhydrous or solid product is desired, it is still necessary to concentrate the 50 per cent solution in conventional manner in a "caustic pot." The usual difficulties are encountered in the latter operation.

The present invention is based upon the discovery that anhydrous ammonia, or at least ammonia of relatively high concentration, under proper conditions, is capable of removing water of solution and crystallization from caustic soda solutions of 50 per cent or higher concentration, to precipitate or otherwise form a solid anhydrous product. The temperature, at which removal of water from caustic soda is accomplished, may be varied over a relatively wide range. For example, caustic soda solutions of about 50 per cent or higher concentration may be treated with ammonia at a temperature below about 55–65 degrees C. to precipitate one of the solid hydrates, such as the monohydrate. It is found that this hydrate, upon continued treatment with anhydrous ammonia, is completely dehydrated even at low temperatures to form a porous, flaky material. However, a preferred mode of operation involves treatment of concentrated aqueous caustic soda with anhydrous ammonia at a temperature above a transition temperature of about 60–65 degrees C. Anhydrous caustic is then directly precipitated in the form of free-flowing crystals. Since ammonia has a relatively high vapor pressure, the operation should be conducted in a suitable pressure apparatus.

Most efficient operation is obtained by a progressive removal of the water and final precipitation of anhydrous caustic, either by application and removal of a plurality of successive portions of ammonia, or by continuous countercurrent treatment of the caustic with ammonia in a suitable apparatus. In any event, final treatment of a given unit of caustic should be with ammonia of high concentration.

If anhydrous caustic is desired, lowering of the temperature below the transition point prior to completion of the precipitation of anhydrous caustic and prior to the removal of any ammonia which has taken up a material amount of water is to be avoided. If this precaution is not taken, the caustic will tend to reabsorb water. This may be admissible to a degree if monohydrate is desired. After anhydrous state in both caustic and ammonia has been attained, the temperature may be lowered substantially to any desired point prior to separation of the caustic. These facts are equally true of either continuous or intermittent types of processes.

The following constitute specific examples of the application of the principles of the invention:

*Example 1.*—About 100 parts by weight of 50% NaOH at 100 degrees C. was treated with three portions of anhydrous liquid ammonia in an autoclave. After the last extraction the residue consisted of approximately 50 parts of anhydrous, crystalline, free-flowing caustic soda. The total amount of ammonia employed may be varied over a relatively wide range depending upon the initial concentration of the caustic solution. As little as about two parts by weight per part of anhydrous caustic obtained may be sufficient. On the other hand ten or more parts of ammonia per part of anhydrous caustic are also feasible.

*Example 2.*—About 180 parts by weight of 50% NaOH at 80 degrees C. were treated with five portions of anhydrous ammonia having a combined weight equal to about eight times that of the anhydrous NaOH. The original solution contained 2.26% NaCl on solid basis (a typical electrolytic caustic liquor, while the residue after treatment was anhydrous, crystalline caustic containing only .03% NaCl.

*Example 3.*—About 200 parts by weight of 72% NaOH were treated with successive portions of liquid ammonia at 50 degrees C. The water was progressively absorbed from the caustic with eventual formation of crystals of anhydrous material. The resulting anhydrous caustic was an exceedingly light porous fluffy powder, that is to say a powder the individual particles of which contain fine pores or cells.

*Example 4.*—A stream of 50% caustic liquor was treated countercurrently and continuously with from 200 to 1000% anhydrous liquid ammonia based upon the weight of anhydrous NaOH. At a temperature of 100 degrees C. crystalline anhydrous caustic was removed from the bottom of the apparatus. The liquid ammonia, now containing a small percentage of water, was freed of its water content and its various impurities by fractional distillation and recycled.

In the foregoing examples the yields were almost theoretical. Preliminary concentration of such dilute caustic liquors as are obtained by ordinary methods of electrolysis or causticization may be evaporated to concentrations of about 50 to 70% or even higher. The process disclosed in Patent 1,961,590 may likewise be employed to obtain liquor of 50% concentration. Sodium sulfate and calcium carbonate, frequently present in caustic solutions, may be removed from the partially concentrated liquors in conventional manner preliminary to final dehydration with anhydrous ammonia.

The temperature, which may be employed in the applicant's process, may vary over a relatively wide range. Approximately 50 or 60 degrees C. is a satisfactory lower limit. The upper limit will depend primarily upon the pressure which the apparatus is designed to resist. Within reasonable limits practically any temperatures may be employed. However, a temperature range of about 70 to 80 degrees C. is preferred. The ammonia employed in the process is readily recoverable in practically pure form and with but very slight loss by distillation in a conventional ammonia still.

The advantages of the present method of preparing anhydrous caustic over conventional methods are numerous. It may be operated continuously with all the accruing advantages. The only heat required is that for maintaining the temperature of the dehydrating and precipitating chamber and for the fractional distillation of the ammonia to remove water. This heat may be economically and efficiently supplied by low pressure steam. The anhydrous caustic soda is neither very hot nor molten during any part of the operation, thus eliminating the hazardous handling required in concentration by evaporation. Furthermore, sodium chloride present in the original liquor is almost completely removed, thus making it possible to prepare a high grade caustic even from electrolytic liquor. Because of the absence of metallic impurities "shading" with sulfur to secure a white caustic is unnecessary and such contamination by sodium sulphate, as occurs in "shading," is thereby eliminated. The saving in time required to obtain an anhydrous product is very great. The product is granular, free-flowing and very quickly soluble, but it may be compressed into a dense form, if desired, for more economical shipping.

Although only certain preferred forms of the invention have been described, these are to be considered merely as exemplary. It will be understood by those skilled in the art that numerous modifications may be made therein without departure from the spirit of the invention or the scope of the appended claims.

What I claim is:

1. A method of removing water from aqueous hydroxides of alkali metals, which comprises treating an hydroxide of not less than 50% concentration with substantially anhydrous, liquid ammonia in an amount sufficient to absorb substantially all of the water in said hydroxide and removing the ammonia and absorbed water therein.

2. A method of obtaining anhydrous caustic from relatively dilute solutions, which comprises initially concentrating the dilute solution to obtain caustic of not less than about 50% concentration, then treating the solution with sufficient substantially anhydrous, liquid ammonia to absorb substantially all of the water and removing the ammonia and absorbed water therein to obtain anhydrous caustic.

3. A method of producing anhydrous caustic from aqueous solutions of caustic, which comprises progressively removing the water from the solution by applying thereto anhydrous liquid ammonia and subsequently removing therefrom ammonia and water mixture until substantially all water is removed.

4. A process as defined in claim 3 in which the ammonia is applied in a plurality of portions; one portion being at least partially removed before the application of the succeeding portions.

5. A process as defined in claim 3 in which the caustic is progressively dehydrated by a countercurrent of substantially anhydrous, liquid ammonia.

6. A process as defined in claim 3 in which the caustic is initially of approximately 50% concentration, and the water is removed by applying a plurality of successive portions of anhydrous, liquid ammonia and at least partially removing each portion prior to applying successive portions.

7. A process as defined in claim 3 in which the caustic is initially of at least approximately 50% concentration and the ammonia is applied in continuous counter-current.

8. Anhydrous caustic soda composed of fluffy, porous particles obtained by removing the water from a solution of caustic soda of at least 50% concentration by application of substantially anhydrous, liquid, ammonia.

9. A method of preparing anhydrous caustic, which comprises continuously treating caustic of at least 50% concentration with a current of liquid, anhydrous ammonia in sufficient amounts to remove substantially all the water from the caustic, withdrawing the ammonia and absorbed water until substantially all the water is removed, subjecting the ammonia to distillation to eliminate water, and then to recycling.

10. A method of preparing anhydrous caustic soda which comprises treating aqueous caustic soda of above 50% concentration with substantially anhydrous ammonia in sufficient amounts and at such a temperature that anhydrous caustic is precipitated, then removing the precipitated caustic.

11. A method as defined in claim 10 in which the temperature of treatment is above 60 degrees C.

12. A method as defined in claim 10 in which the temperature is maintained approximately within the range of 70 to 80 degrees C.

13. A method of preparing anhydrous caustic soda which comprises treating a solid hydrate of caustic soda with substantially anhydrous liquid ammonia in an amount sufficient to withdraw substantially all of the water from said hydrate.

IRVING E. MUSKAT.